United States Patent
Seo

(10) Patent No.: US 9,927,683 B2
(45) Date of Patent: Mar. 27, 2018

(54) ACCESSORY SHOE DEVICE TO WHICH PHOTOGRAPHIC ACCESSORY CAN BE ATTACHED, AND IMAGE PICKUP APPARATUS

(71) Applicant: CANON KABUSHIKI KAISHA, Tokyo (JP)

(72) Inventor: Takazumi Seo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/422,994

(22) Filed: Feb. 2, 2017

(65) Prior Publication Data
US 2017/0219917 A1   Aug. 3, 2017

(30) Foreign Application Priority Data

Feb. 3, 2016 (JP) ................................. 2016-018795

(51) Int. Cl.
| | | |
|---|---|---|
| *G03B 17/56* | (2006.01) | |
| *H01R 12/77* | (2011.01) | |
| *H01R 13/24* | (2006.01) | |
| *H01R 13/52* | (2006.01) | |
| *H01R 13/629* | (2006.01) | |
| *H01R 13/639* | (2006.01) | |

(52) U.S. Cl.
CPC .......... *G03B 17/566* (2013.01); *H01R 12/77* (2013.01); *H01R 13/2442* (2013.01); *H01R 13/52* (2013.01); *H01R 13/629* (2013.01); *H01R 13/639* (2013.01)

(58) Field of Classification Search
CPC .................................................. G03B 17/566
See application file for complete search history.

(56) References Cited

U.S. PATENT DOCUMENTS

| | | | | |
|---|---|---|---|---|
| 4,704,023 A | * | 11/1987 | Curran | ..................... G03B 7/16 396/160 |
| 4,926,207 A | * | 5/1990 | Eguchi | ................... G03B 17/02 396/301 |
| 2012/0189292 A1 | * | 7/2012 | Kim | ........................ G03B 15/03 396/198 |
| 2013/0271944 A1 | * | 10/2013 | Lew | ...................... F21V 23/005 362/4 |

FOREIGN PATENT DOCUMENTS

JP        2015-141403 A        8/2015

* cited by examiner

*Primary Examiner* — Clayton E LaBalle
*Assistant Examiner* — Dennis Hancock
(74) *Attorney, Agent, or Firm* — Cowan, Liebowitz & Latman, P.C.

(57) ABSTRACT

An accessory shoe device capable of improving drip-proof performance while ensuring positional accuracy in a pitch direction in which terminals of a multi-polarized signal terminal connector are arranged. The accessory shoe device includes an engagement member for having an accessory attached thereto, a signal terminal connector including terminals for connection with the accessory attached to the engagement member, a top cover having the engagement member mounted thereon, and a positioning unit for positioning the signal terminal connector with respect to the engagement member. The top cover has an opening for externally exposing the terminals of the signal terminal connector. The signal terminal connector and the engagement member are fixed to each other by the positioning unit such that they sandwich a portion of the top cover surrounding the signal terminal connector.

9 Claims, 6 Drawing Sheets

ACCESSORY SHOE DEVICE TO WHICH PHOTOGRAPHIC ACCESSORY CAN BE ATTACHED, AND IMAGE PICKUP APPARATUS

BACKGROUND OF THE INVENTION

Field of the Invention

The present invention relates to an accessory shoe device to which an accessory is attached, and an image pickup apparatus equipped with the accessory shoe device.

Description of the Related Art

As an image pickup apparatus, there has been known an image pickup apparatus equipped with an accessory shoe device to which a photographic accessory (hereinafter simply referred to as "the accessory") can be attached. The accessory shoe device of the image pickup apparatus is provided with an engagement portion for attachment of an accessory.

As the accessory attachable to the accessory shoe device, there may be mentioned not only an external strobe device, but also an electronic viewfinder (external display device) provided with a small-sized liquid crystal screen. In an area of the engagement portion of the accessory shoe device to which the electronic viewfinder can be attached, there is provided a connection connector comprised of a plurality of connection terminals for attachment of the electronic viewfinder, in addition to a connection terminal for connection with the external strobe device. Thus, the accessory shoe device has a configuration in which the two kinds of accessories, i.e. the external strobe device and the electronic viewfinder, can be selectively attached to the single engagement portion.

The accessory shoe device for attachment of the external strobe device has a shape defined by JIS. JIS defines the shape of the engagement portion for engagement with a connector portion of an accessory and the positional relationship between the external strobe device and a synchronizer contact.

As for the electronic viewfinder, in recent years, there has been a tendency toward multi-polarization, i.e. an increased number of connection signal terminals for connection to an image pickup apparatus according to an increasing demand for an increase in the number of pixels and a higher frame rate. For this reason, an attempt has been made to perform multi-polarization of a connector for connection with the electronic viewfinder within the shape of the engagement portion of the accessory shoe device, but this is not easy due to restriction on space. Further, to perform multi-polarization of the connector for connection with the electronic viewfinder under conditions where space is restricted, positional accuracy in positioning of the accessory shoe and the connection connector in a pitch direction in which the terminals of the connection connector are arranged becomes more significant for achievement of normal electrical connection.

In view of this, there has been proposed an accessory shoe device having an accessory shoe and a connection connector integrally combined with each other (see Japanese Patent Laid-Open Publication No. 2015-141403).

In the accessory shoe device proposed in Japanese Patent Laid-Open Publication No. 2015-141403, since the accessory shoe and the signal terminal connector for connection with an electronic viewfinder are integrally combined with each other, it is possible to ensure the positional accuracy in positioning the accessory shoe and the signal terminal connector in the pitch direction in which the terminals of the signal terminal connector are arranged.

However, the unitized accessory shoe is required to be electrically connected to an image pickup apparatus (camera) body. For this reason, in order to connect a flexible circuit board having the accessory shoe mounted thereon to a main circuit board inside the image pickup apparatus (camera) body, the image pickup apparatus (camera) body has to be formed with an opening at a location close to an accessory shoe mount, for insertion of the flexible circuit board. In this configuration, however, there is a fear that water droplets or moisture from outside can enter the image pickup apparatus via a gap between the accessory shoe mount and the accessory shoe and a periphery of the opening through which the flexible substrate is inserted.

SUMMARY OF THE INVENTION

The present invention provides an accessory shoe device which is capable of improving drip-proof performance while ensuring positional accuracy in a pitch direction in which terminals of a multi-polarized signal terminal connector are arranged, and an image pickup apparatus including the accessory shoe device.

In a first aspect of the invention, there is provided an accessory shoe device comprising an engagement member configured to have an accessory attached thereto, a signal terminal connector having terminals for connection with the accessory attached to the engagement member, an exterior member having the engagement member mounted thereon, and a positioning unit configured to determine a position of the signal terminal connector with respect to the engagement member, wherein the exterior member has an opening for externally exposing the terminals of the signal terminal connector, and wherein the signal terminal connector and the engagement member are fixed to each other by the positioning unit in such a manner that the signal terminal connector and the engagement member sandwiches therebetween a portion of the exterior member surrounding the signal terminal connector.

In a second aspect of the invention, there is provided an image pickup apparatus including an accessory shoe device to which an accessory is attached, wherein the accessory shoe device comprises an engagement member configured to have an accessory attached thereto, a signal terminal connector having terminals for connection with the accessory attached to the engagement member, an exterior member having the engagement member mounted thereon, and a positioning unit configured to determine a position of the signal terminal connector with respect to the engagement member, wherein the exterior member has an opening for externally exposing the terminals of the signal terminal connector, and wherein the signal terminal connector and the engagement member are fixed to each other by the positioning unit in such a manner that the signal terminal connector and the engagement member sandwiches therebetween a portion of the exterior member surrounding the signal terminal connector.

According to the invention, since the signal terminal connector and the engagement member are fixed in such a manner that the signal terminal connector and the engagement member sandwiches therebetween the exterior member of the image pickup apparatus surrounding the signal terminal connector, it is possible to eliminate a gap between the signal terminal connector and the exterior member to thereby improve the drip-proof performance of the accessory shoe device while ensuring positional accuracy in the pitch direction in which the terminals of the multi-polarized signal terminal connector are arranged.

Further features of the present invention will become apparent from the following description of exemplary embodiments (with reference to the attached drawings).

DESCRIPTION OF THE EMBODIMENTS

The present invention will now be described in detail below with reference to the accompanying drawings showing an embodiment thereof.

Figure 1A:
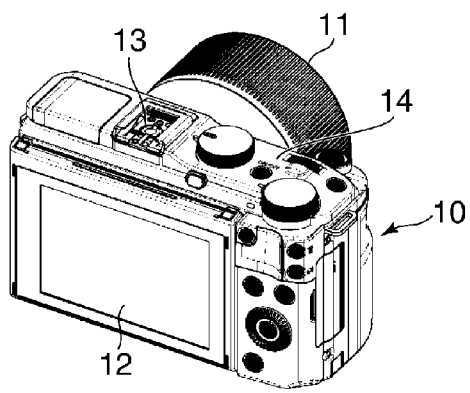
FIG. 1A is a rear perspective view of an image pickup apparatus according to an embodiment of the present invention.
Figure 1B:
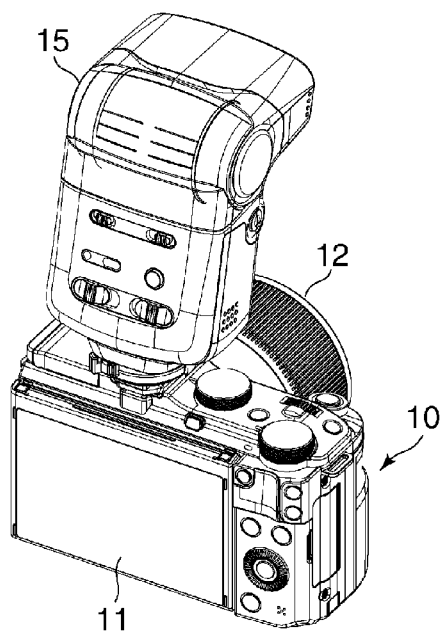
FIG. 1B is a rear perspective view of the image pickup apparatus with an external strobe device attached thereto.
Figure 1C:
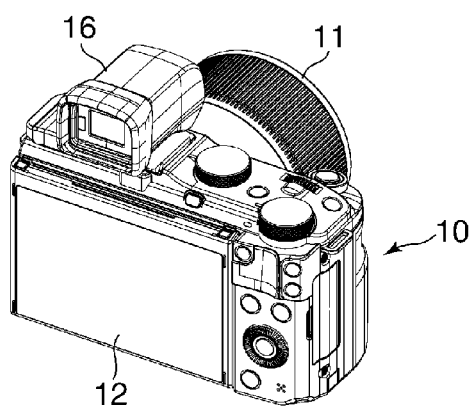
FIG. 1C is a rear perspective view of the image pickup apparatus with an external display device attached thereto.
Figure 1D:
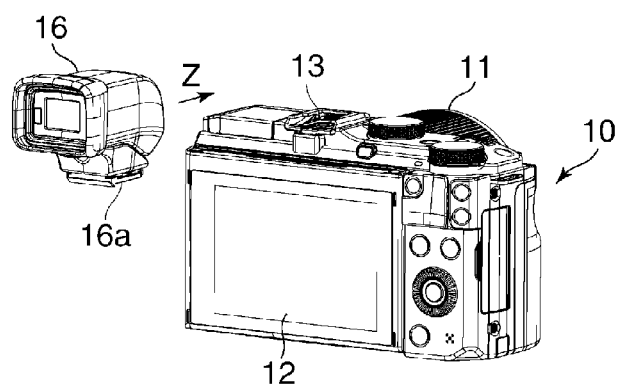
FIG. 1D is a view showing how the external display device is attached to an accessory shoe device of the image pickup apparatus.

FIGS. 1A to 1D are views of an image pickup apparatus according to the embodiment. FIG. 1A is a rear perspective view of the image pickup apparatus, and FIG. 1B is a rear perspective view of the image pickup apparatus with an external strobe device attached thereto. Further, FIG. 1C is a rear perspective view of the image pickup apparatus with an external display device attached thereto, and FIG. 1D is a view showing how the external display device is attached to an accessory shoe device of the image pickup apparatus.

As shown in FIG. 1A, the image pickup apparatus 10 is provided with a lens barrel 11 for taking an object image into an image pickup device, not shown, a liquid crystal monitor 12, an accessory shoe device (hereinafter simply referred to as "the accessory shoe") 13, and a top cover 14. A user of the image pickup apparatus 10 can check an object image by the liquid crystal monitor 12. The accessory shoe 13 as an accessory mount forms a portion of the top cover 14 as an exterior member.

In FIG. 1B, the accessory shoe 13 of the image pickup apparatus 10 has the external strobe device (hereinafter simply referred to as "the external strobe") 15 attached thereto as an accessory. The external strobe 15 is used to irradiate an object with light for shooting. Further, in FIG. 1C, the accessory shoe 13 of the image pickup apparatus 10 has an electronic viewfinder 16 attached thereto as an external display device equipped with a small-sized liquid crystal device. The user of the image pickup apparatus 10 can check an object image to be taken into the image pickup device, by the electronic viewfinder 16, similarly to the case of using the liquid crystal monitor 12.

As shown in FIG. 1D, the electronic viewfinder 16 is equipped with a connection plug 16a for connection to the accessory shoe 13 provided in the body of the image pickup apparatus 10. The electronic viewfinder 16 is attached to the image pickup apparatus 10 by sliding the connection plug 16a in a Z direction indicated by an arrow appearing in FIG. 1D, and engaging the same with the accessory shoe 13. The sliding direction corresponds to a direction from the rear i.e. the liquid crystal monitor side of the image pickup apparatus 10, toward the lens barrel 11.

Next, a description will be given of the arrangement of the accessory shoe 13.

Figure 2A:
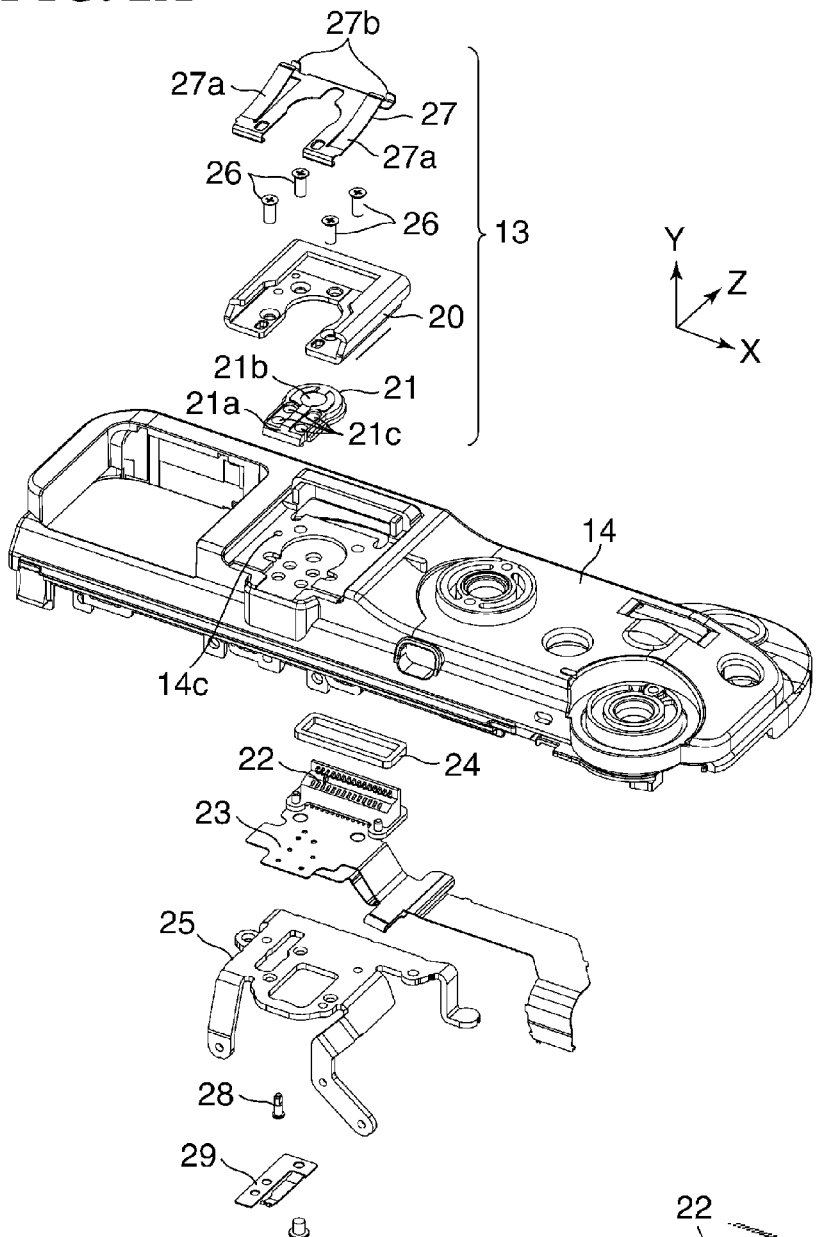
FIG. 2A is an exploded perspective view showing the accessory shoe device of the image pickup apparatus in a disassembled state, together with a top cover.
Figure 2B:
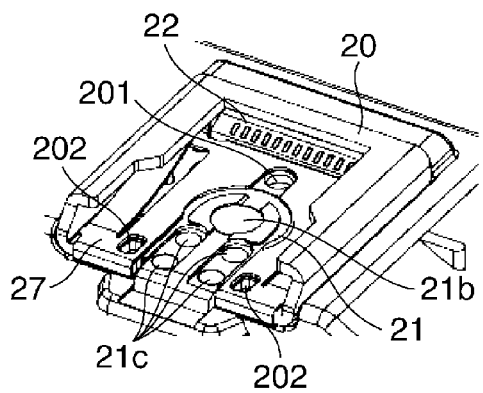
FIG. 2B is an assembled perspective view of the accessory shoe device.

FIGS. 2A and 2B are views showing the arrangement of the accessory shoe 13 of the image pickup apparatus 10 shown in FIGS. 1A to 1D. FIG. 2A is an exploded perspective view showing the accessory shoe 13 in a disassembled state, together with the top cover 14, and FIG. 2B is an assembled perspective view of the accessory shoe 13.

In FIG. 2A, a direction indicated by an arrow Z corresponds to a direction in which an accessory is attached to the accessory shoe 13. A direction indicated by an arrow X corresponds to a direction orthogonally intersecting the accessory attaching direction and parallel to the longitudinal direction of the top cover 14. A direction indicated by an arrow Y corresponds to a direction orthogonally intersecting the accessory attaching direction and the longitudinal direction of the top cover 14, and this direction corresponds to a direction in which the accessory shoe 13 is assembled to the top cover 14. Note that the top cover 14 is the exterior member that forms the appearance of the top surface of the image pickup apparatus 10, and the accessory shoe 13 is mounted to the top cover 14.

As shown in FIGS. 2A and 2B, the accessory shoe 13 is mainly comprised of an engagement member 20, a signal terminal stage 21 for an external strobe, a signal terminal connector 22 for the electronic viewfinder 16 (i.e. for an external display device), and an accessory shoe spring 27.

The engagement member 20 is a member for holding the external strobe 15 or the electronic viewfinder 16 as an accessory by engagement therewith. The signal terminal stage 21 for an external strobe (hereinafter simply referred to as "the signal terminal stage 21") is comprised of a stage base member 21a made of a synthetic resin material, a synchronizer contact 21b held by the stage base member 21a, and a plurality of contacts 21c. The signal terminal stage 21 is positioned by a first positioning portion 20d (see FIGS. 3A to 3D) of the engagement member 20. The signal terminal stage 21 is a connection terminal for communication of a signal with an external strobe device.

The signal terminal connector 22 for the electronic viewfinder 16 (hereinafter simply referred to as "the signal terminal connector 22") is provided with a plurality of terminals (see FIG. 3C) arranged side by side at the same pitch in the X direction on a connector base member made of a synthetic resin material.

Each of the synchronizer contact 21b, the contacts 21c of the signal terminal stage 21, and the terminals of the signal terminal connector 22 is electrically joined to a flexible circuit board 23 disposed below the top cover 14. The flexible circuit board 23 is connected to a main circuit board, not shown, of the image pickup apparatus 10, and is configured to be connectable to the external strobe 15 and the electronic viewfinder 16. This enables the external strobe 15 or electronic viewfinder 16 attached to the engagement member 20 to communicate with the image pickup apparatus 10.

A packing member 24 is disposed in a manner surrounding the whole periphery of the signal terminal connector 22. The packing member 24 is made of an elastic member, such as a rubber member, which can be largely deformed by a small force and has a large elastic deformation range. The location of the packing member 24 will be described hereinafter.

An accessory shoe holding member 25 is a structural framework for holding the engagement member 20, and is positioned with respect to the top cover 14 by a fastening portion (not shown). The fastening portion is provided with four screws 26, for example, and each of the screws 26 extends to the accessory shoe holding member 25 through the engagement member 20, the top cover 14, and the flexible circuit board 23, each appearing in FIG. 2A, and is fastened to the accessory shoe holding member 25 appearing in FIG. 2A.

The signal terminal stage 21 has an outer periphery thereof sandwiched by the engagement member 20 and the top cover 14, whereby the signal terminal stage 21 is fixed to the top cover 14. The signal terminal connector 22 is sandwiched by the top cover 14 and the accessory shoe holding member 25, whereby the packing member 24 is crushed to fill a gap between the top cover 14 and the signal terminal connector 22.

The accessory shoe spring 27 is formed of a conductive metal material. The accessory shoe spring 27 has elastic deformation portions 27a for urging an accessory attached to the engagement member 20 in the Y direction, and abutment surfaces 27b for abutment of the accessory in the Z direction. The top cover 14 is formed with a slide hole 14c, and a detection pin 28 is inserted through the slide hole 14c for contact with the accessory shoe spring 27.

A contact piece member 29 is disposed at a location opposed to the accessory shoe spring 27 via the detection pin 28. When there is no accessory attached to the accessory shoe 13, the contact piece member 29 is in contact with a pattern (not shown) on the flexible circuit board 23. When an accessory is attached to the accessory shoe 13, the detection pin 28 is pressed down in the Y direction by the accessory shoe spring 27. As a consequence, the contact piece member 29 is moved away from the pattern on the flexible circuit board 23, whereby attachment of the accessory is detected. Thus, the attachment of the accessory to the image pickup apparatus 10 is detected, whereafter the attached accessory is synchronized with the image pickup apparatus 10.

Referring to FIG. 2B, the engagement member 20 is provided for being engaged with the external strobe 15 or the electronic viewfinder 16 as an accessory, to hold the same. Inside the engagement member 20, there is provided the signal terminal stage 21 as the connection terminal for communication with the external strobe 15. The synchronizer contact 21b is disposed in a central part of the signal terminal stage 21. The contacts 21c arranged in the vicinity of the synchronizer contact 21b are provided as communication terminals for controlling the external strobe 15 engaged with the engagement member 20.

The signal terminal connector 22 is disposed forward of the synchronizer contact 21b, as viewed in the attaching direction of the electronic viewfinder 16, i.e. in the direction indicated by the arrow Z in FIGS. 2A and 2B. Between the synchronizer contact 21b and the signal terminal connector 22, there is formed a first engagement hole 201 for engagement with a lock pin (not shown) of the external strobe 15. In the vicinity of the contacts 21c, there are formed a pair of second engagement holes 202 for engagement with respective engagement lugs (not shown) of the electronic viewfinder 16.

As shown in FIGS. 2A and 2B, the engagement member 20 is assembled from an exterior surface side of the exterior member 14, and the signal terminal connector 22 is assembled from an interior surface side (opposite side to the exterior surface side) of the exterior member 14.

Next, a detailed description will be given of the main component members of the accessory shoe 13.

Figure 3A:
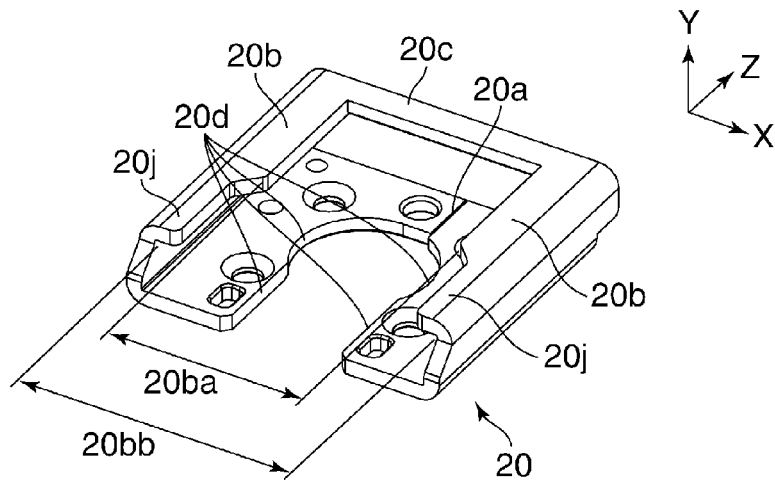
FIG. 3A is a top perspective view of an engagement member.
Figure 3B:
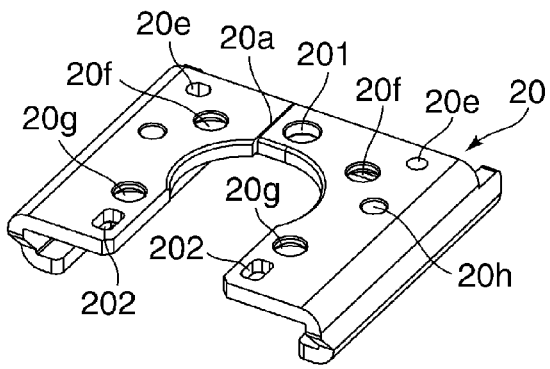
FIG. 3B is a bottom perspective view of the engagement member.
Figure 3C:
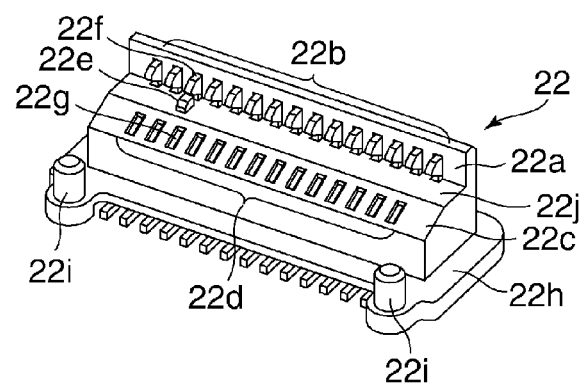
FIG. 3C is a perspective view of a signal terminal connector as a main component member of the accessory shoe device.

FIGS. 3A to 3C are views useful in explaining the main component members of the accessory shoe 13. FIG. 3A is a top perspective view of the engagement member 20, and FIG. 3B is a bottom perspective view of the same. Further, FIG. 3C is a perspective view of the signal terminal connector 22.

As shown in FIGS. 3A and 3B, the engagement member 20 is formed by bending a metal material having a generally flat plate into a loop shape. More specifically, the plate-shaped metal material is bent such that end faces of respective opposite ends of the metal material abut each other in an opposed state whereby the plate-shaped metal material is formed into a loop shape. Portions of the opposed two end faces in abutment with each other form a seam 20a.

The engagement member 20 has a pair of engagement portions 20b and a connection portion 20c that connects the pair of engagement portions 20b to each other. An upper portion, as viewed in FIG. 3B, which includes the seam 20a, of the engagement member 20A is formed with the first positioning portion 20d (denoted in FIG. 3A) for positioning the signal terminal stage 21, and a pair of second positioning portions 20e for positioning the signal terminal connector 22. Further, the engagement member 20 is formed with a pair of first screw holes 20f and a pair of second screw holes 20g for positioning the engagement member 20 with respect to the top cover 14. Furthermore, the engagement member 20 is formed with the first engagement hole 201 for engagement with the lock pin of the external strobe 15, the pair of second engagement holes 202 for engagement with the respective two engagement lugs of the electronic viewfinder 16, and a through hole 20h for the detection pin 28.

As shown in FIG. 3A, the pair of engagement portions 20b as first engagement portions are spaced from each other by a predetermined distance in the X direction. More specifically, the pair of engagement portions 20b are spaced from each other by an engagement portion spacing 20ba for allowing insertion of a connection plug of an accessory. Further, at a location rearward of the pair of engagement portions 20b, there are formed a pair of engagement portions 20j as second engagement portions for allowing insertion of a connection plug of an accessory, similar to the first engagement portions. Spacing between the second engagement portions is larger than spacing between the first engagement portions. Spacing between side walls formed by lower portions of component portions forming the first and second engagement portions is still larger than that between the second engagement portions. This spacing will be referred to as "the inner side wall spacing 20bb".

The first positioning portion 20d formed in the central part of the engagement member 20 positions the signal terminal stage 21. The second positioning portions 20e formed in a front end of the engagement member 20 in the Z direction position the signal terminal connector 22. The pair of second positioning portions 20e are formed apart from each other in the X direction at a location forward of the synchronizer contact 21b (see FIGS. 2A and 2B), as viewed in the Z direction.

As shown in FIG. 3B, the seam 20a of the engagement member 20 is located between the first engagement hole 201 and one of the first screw holes 20f.

The pair of first screw holes 20f are formed apart from each other in the X direction. More specifically, the pair of first screw holes 20f function as a pair of first fastening holes aligned in the X direction, at the location forward of the synchronizer contact 21b in the Z direction. Further, the pair of second screw holes 20g are formed apart from each other in the X direction. More specifically, the pair of second screw holes 20g function as a pair of second fastening holes aligned in the X direction, at a location rearward of the synchronizer contact 21b in the Z direction.

The first engagement hole 201 is engageable with the lock pin of an accessory, and is formed between the pair of first screw holes 20f. The pair of second engagement holes 202 are engageable with the respective pair of engagement protrusions of an external accessory. The pair of second engagement holes 202 are formed such that the second engagement holes 202 and the second screw holes 20g are aligned in the Z direction, respectively. The second engagement holes 202 are located rearward of the respective second screw holes 20g, as viewed in the Z direction.

As shown in FIG. 3C, the signal terminal connector 22 is formed with a first contact surface 22a extending perpendicular to the Z direction which is the attaching direction of the electronic viewfinder 16. A first terminal row 22b formed by a plurality of connection terminals is exposed from the first contact surface 22a. On a near side of the first contact surface 22a in the attaching direction of the electronic viewfinder 16, there is formed a second contact surface 22c sloped with respect to the first contact surface 22a. A second terminal row 22d formed by a plurality of connection terminals is exposed from the second contact surface 22c. The terminals of the first terminal row 22b and those of the second terminal row 22d are in staggered arrangement.

Between the first contact surface 22a and the second contact surface 22c, there is formed a third surface 22j. On the third surface 22j, there is provided a fitting key 22e for regulating fitting relationship between the signal terminal connector 22 and the connection plug 16a of the electronic viewfinder 16 (see FIG. 1D). At least one of a first-row terminal 22f and a second-row terminal 22g located forward and rearward of the fitting key 22e, respectively, is a detection signal terminal for detecting connection of the connection plug 16a of the electronic viewfinder 16. When an attempt is made to attach a wrong external accessory device having a similar shape, connection of the detection signal terminal is prevented by shape regulation by the fitting key 22e. Consequently, when the wrong external accessory is erroneously attached to the image pickup apparatus 10, the detection signal terminal is not connected, so that communication between the external accessory and the image pickup apparatus 10 is disabled. This configuration makes it possible to ensure a function that permits attachment of a specific accessory alone.

The signal terminal connector 22 has a flange 22h formed around the whole periphery thereof at a location upward of a lead portion for electrical connection to the flexible circuit board 23. The flange 22h is formed with a pair of positioning protrusions 22i protruding in the Y direction. The positioning protrusions 22i are located outward of lead portions of respective outermost terminals, which are joined to a printed wiring board, in the X direction which is a pitch direction in which the terminals are arranged. Further, the positioning protrusions 22i are located in a projection area of the engagement member 20 (where a shadow of the engagement member 20 is imaginarily projected) in the assembling direction (Y direction) of the accessory shoe 13 in which the accessory shoe 13 is assembled to the top cover 14. The positioning protrusions 22i are fitted in the respective second positioning portions 20e of the engagement member 20, whereby the signal terminal connector 22 and the engagement member 20 are positioned.

Next, a detailed description will be given of a method of positioning the signal terminal stage 21 and the signal terminal connector 22 with respect to the engagement member 20.

Figure 4A:
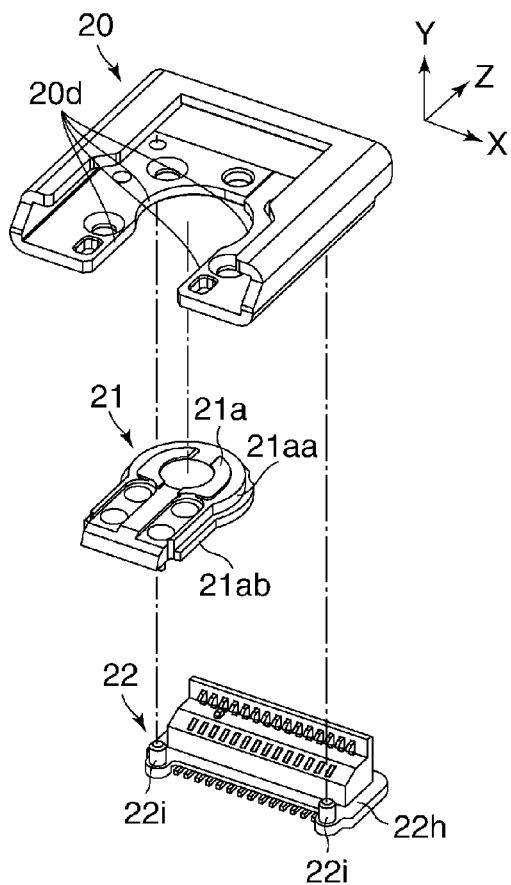
FIG. 4A is a top exploded perspective view useful in explaining positioning of a signal terminal stage and the signal terminal connector with respect to the engagement member.
Figure 4B:
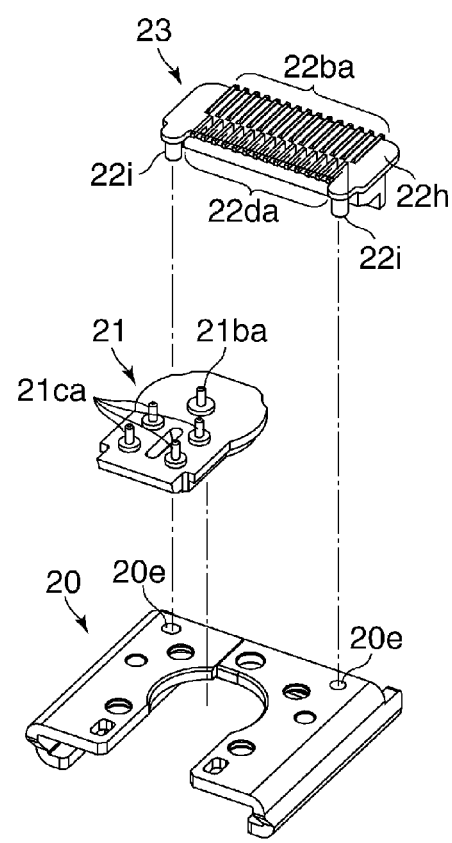
FIG. 4B is a bottom exploded perspective view useful in explaining positioning of the signal terminal stage and the signal terminal connector with respect to the engagement member.

FIGS. 4A and 4B are exploded perspective views useful in explaining how the signal terminal stage 21 and the signal terminal connector 22 are positioned with respect to the engagement member 20.

As shown in FIGS. 4A and 4B, the engagement member 20 is formed with the first positioning portion 20d for positioning the engagement member 20 and the signal terminal stage 21. The stage base member 21a of the signal terminal stage 21 is formed with an outer fitting portion 21aa for fitting in the first positioning portion 20d. Around the outer periphery of the outer fitting portion 21aa, there is formed a flange 21ab. The signal terminal stage 21 is positioned by the first positioning portion 20d and the outer fitting portion 21aa, and then the flange 21ab is sandwiched between the engagement member 20 and the top cover 14 (see FIGS. 2A and 2B), whereby the signal terminal stage 21 is fixed. In short, the signal terminal stage 21 is directly positioned with respect to the engagement member 20.

Further, the engagement member 20 is formed with the pair of second positioning portions 20e for positioning the signal terminal connector 22. As described hereinbefore, the signal terminal connector 22 is formed with the pair of positioning protrusions 22i protruding in the Y direction for fitting in the respective second positioning portions 20e. The engagement member 20 is positioned by fitting of the pair of positioning portions 20e formed as holes in the engagement member 20 on the pair of positioning protrusions 22i formed on the signal terminal connector 22. Further, in the pitch direction (X direction) in which the terminals of the signal terminal connector 22 are arranged, the connection plug 16a (see FIG. 1D) of the electronic viewfinder 16 has its position regulated by the inner side wall spacing 20bb (see FIG. 3A) between the first engagement portions 20b of the engagement member 20.

In short, the signal terminal connector 22 and the connection plug 16a are directly positioned with respect to the engagement member 20, and hence the positions of the signal terminal connector 22 and the connection plug 16a can be determined with accuracy.

The signal terminal connector 22 is fixed by being sandwiched by the top cover 14 (see FIG. 2A) and the accessory shoe holding member 25 (see FIG. 2A) via the packing member 24 (see FIG. 2A) placed on the flange 22h. The packing member 24 fills a gap between the signal terminal connector 22 and the top cover 14.

As shown in FIG. 4B, a lead 21ba of the synchronizer contact 21b and leads 21ca of the respective contacts 21c extend to protrude from the lower surface of the signal terminal stage 21. Each of the lead 21ba of the synchronizer contact 21b and the leads 21ca of the respective contacts 21c is joined to the flexible circuit board 23 e.g. by soldering. Further, leads 22ba of the first terminal row 22b and leads 22da of the second terminal row 22d, which are joined to the flexible circuit board 23 e.g. by soldering, extend to protrude from the lower surface of the flange 22h of the signal terminal connector 22.

Next, a description will be given of a method of mounting the accessory shoe 13 to the top cover 14.

Figure 5A:
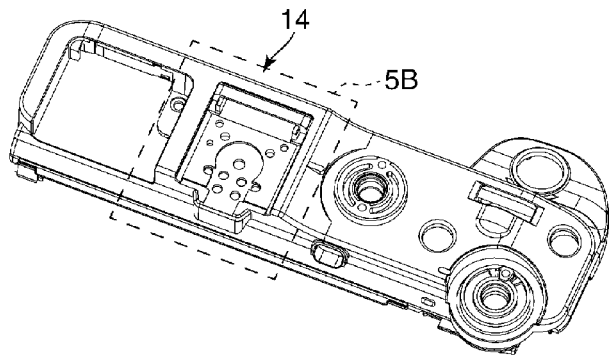
FIG. 5A is a perspective view of the top cover including a portion to which the accessory shoe device is attached, as viewed from an exterior surface side of the top cover.
Figure 5B:
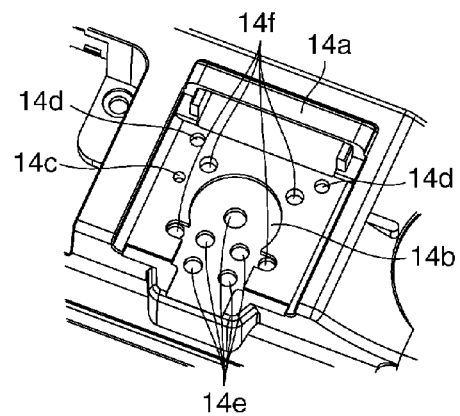
FIG. 5B is an enlarged perspective view of the portion to which the accessory shoe device is attached, as viewed from the exterior surface side.
Figure 5C:
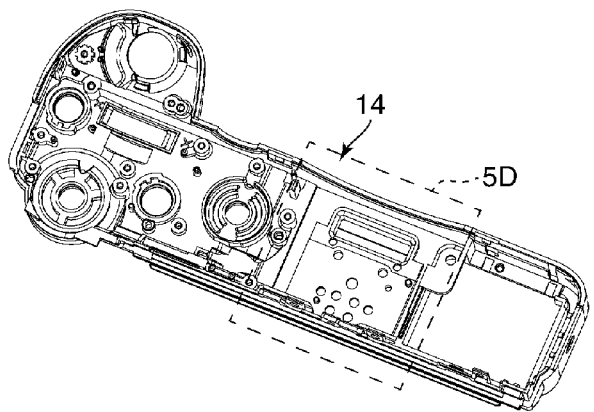
FIG. 5C is a perspective view of the top cover including the portion to which the accessory shoe device is attached, as viewed from an interior surface side of the top cover.

FIG. 5A is a perspective view of the top cover 14 including a portion (boxed by a broken line 5B) to which the accessory shoe 13 is mounted, as viewed from the exterior surface side of the top cover 14, and FIG. 5B is an enlarged perspective view of the portion. FIG. 5C is a perspective view of the top cover 14 including the portion (boxed by a broken line 5D) to which the accessory shoe 13 is mounted, as viewed from the interior surface side of the top cover 14, and FIG. 5D is an enlarged perspective view of the portion.

Referring to FIGS. 5A and 5B, the top cover 14 is the exterior member that forms the appearance of the top surface of the image pickup apparatus 10, as mentioned hereinabove. On the exterior surface side of the top cover 14, an eave-shaped portion 14a is formed to hide the signal terminal connector 22. Further, on the exterior surface side of the top cover 14, there are formed a recessed portion 14b for accommodating the flange 21ab of the signal terminal stage 21, and the slide hole 14c into which the detection pin 28 is slidably fitted. Further, on the exterior surface side of the top cover 14, there are formed a pair of first through holes 14d through which are inserted the respective positioning protrusions 22i formed on the signal terminal connector 22. Furthermore, on the exterior surface side of the top cover 14, there are formed second through holes 14e through which are inserted the respective leads 21ba and 21ca of the signal terminal stage 21, and screw holes 14f through which the respective screws 26 are inserted.

Figure 5D:
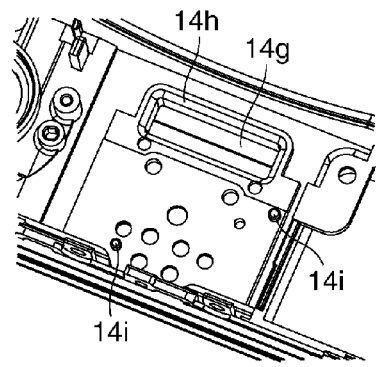
FIG. 5D is an enlarged perspective view of the portion to which the accessory shoe device is attached, as viewed from the interior surface side.

As shown in FIGS. 5C and 5D, on the interior surface side of the top cover 14, there is formed a space 14g that serves as an opening for externally exposing the terminals (i.e. the first terminal row 22b and the second terminal row 22d) of the signal terminal connector 22 and accommodating the signal terminal connector 22. Around the accommodation space 14g, a joining surface 14h for contact with the packing member 24 is formed as a continuous single surface. Further, on the interior surface side of the top cover 14, there is formed a positioning portion 14i for positioning the accessory shoe holding member 25.

Next, a description will be given of drip-proof performance of the accessory shoe device, which is a feature of the present invention.

Figure 6A:
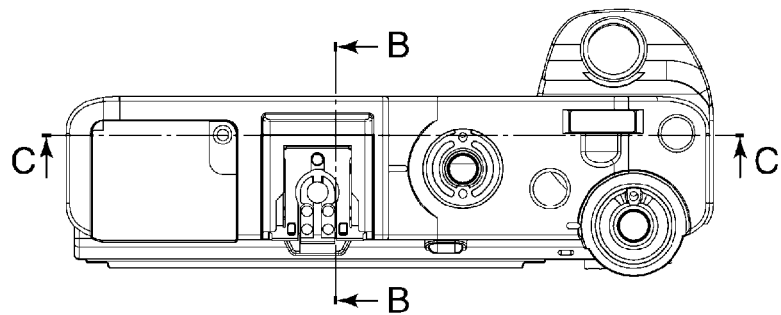
FIG. 6A is a plan view of the accessory shoe device.
Figure 6B:
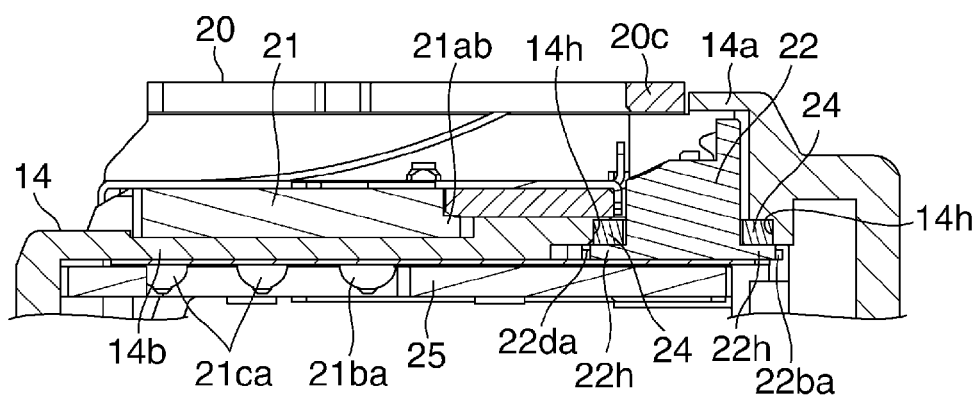
FIG. 6B is a cross-sectional view of the accessory shoe device taken on line B-B in a Z direction of FIG. 6A.
Figure 6C:
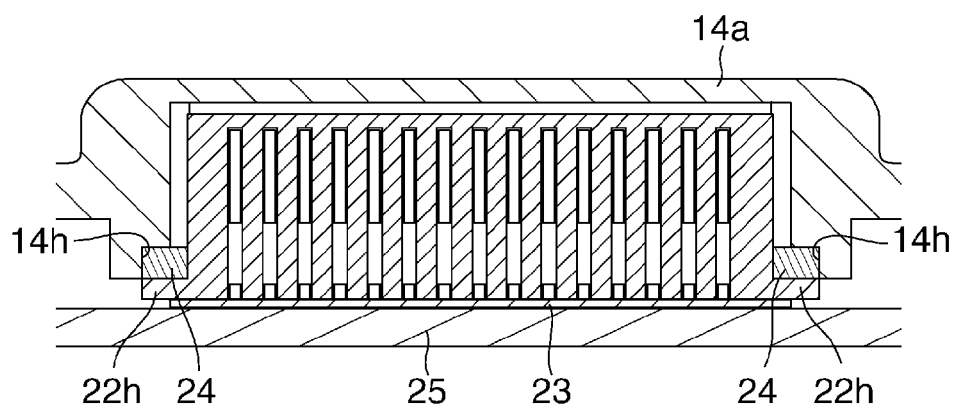
FIG. 6C is a partial cross-sectional view of the accessory shoe device taken on line C-C in an X direction of FIG. 6A.

FIGS. 6A to 6C are views useful in explaining the peripheral structure of the accessory shoe device 13. FIG. 6A is a plan view of the accessory shoe device, FIG. 6B is a cross-sectional view taken on line B-B in a Z direction of FIG. 6A, and FIG. 6C is a partial cross-sectional view taken on line C-C in an X direction of FIG. 6A.

As shown in FIGS. 6A to 6C, the signal terminal stage 21 is accommodated in the recessed portion formed in the top cover 14, with the flange 21ab thereof sandwiched by the engagement member 20 and the top cover 14. Since the signal terminal stage 21 is formed with the flange 21ab, the engagement member 20 and the signal terminal stage 21 have a spigot structure, which prevents water droplets from directly entering the leads 21ba and 21ca of the signal terminal stage 21. In this structure, it is possible to further improve the drip-proof performance by providing an elastic member e.g. of a discontinuous and thin-film foam base material or a rubber material between the signal terminal stage 21 and the top cover 14, and compressing the elastic member.

On the other hand, the signal terminal connector 22 is hidden by the eave-shaped portion 14a formed in the top cover 14 and the connection portion 20c of the engagement member 20. The signal terminal connector 22 is positioned relative to the engagement member 20, and therefore the signal terminal connector 22 cannot be directly positioned with respect to the top cover 14. In other words, it is required to provide a gap between the signal terminal connector 22 and the top cover 14 by taking component part tolerances into account.

In the conventional device, however, there is a fear that water droplets or moisture can enter the image pickup apparatus 10 through the above-mentioned gap.

To solve this problem, in the present embodiment, the signal terminal connector 22 and the engagement member 20 are fixed such that they sandwich the top cover 14 surrounding the signal terminal connector 22, and also the packing member 24 is interposed between the signal terminal connector 22 and the joining surface 14h of the top cover 14. This makes it possible to prevent water droplets or moisture from entering below the signal terminal connector 22, thereby preventing the water droplets or moisture from entering the image pickup apparatus 10 via the opening of the top cover 14 through which the flexible circuit board 23 is inserted, so as to secure the drip-proof performance.

As described above with reference to FIGS. 6A to 6C, the packing member 24 is interposed between the flange 22h of the signal terminal connector 22 and the joining surface 14h of the top cover 14. When the accessory shoe holding member 25 (see FIG. 2A) is drawn in by the screws 26 with the packing member 24 interposed between the flange 22h and the joining surface 14h, the packing member 24 is crushed by the flange 22h of the signal terminal connector 22 and the joining surface 14h of the top cover 14, and the gap between the top cover 14 and the signal terminal connector 22 is eliminated. In short, it is possible to prevent water droplets or moisture from entering below the flange 22h of the signal terminal connector 22. This prevents soldered portions of the leads 22ba and 22da of the respective first and second terminal rows located below the flange 22h of the signal terminal connector 22 from being exposed to external moisture or water droplets.

According to the present embodiment, the signal terminal connector 22 and the engagement member 20 are fixed such that they sandwich the top cover 14 surrounding the signal terminal connector 22, and the packing member 24 is interposed between the signal terminal connector 22 and the joining surface 14h of the top cover 14. This makes it possible to improve the drip-proof performance of the accessory shoe device 13 while ensuring positioning accuracy in the pitch direction (X direction) in which the terminals of the signal terminal connector 22 are arranged, without integrally combining the engagement member 20 and the signal terminal connector 22 with each other.

Although in the present embodiment, the multi-polarized accessory is implemented by the electronic viewfinder by way of example, the multi-polarized accessory may be a large-sized monitor or a microphone.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-018795 filed Feb. 3, 2016 which is hereby incorporated by reference herein in its entirety.

What is claimed is:

1. An accessory shoe device comprising:
an engagement member configured to have an accessory attached thereto;
a signal terminal connector having terminals for connection with the accessory attached to said engagement member;
an exterior member having said engagement member mounted thereon; and
a positioning unit configured to determine a position of said signal terminal connector with respect to said engagement member,
wherein said exterior member has an opening for externally exposing the terminals of said signal terminal connector, and
wherein said signal terminal connector and said engagement member are fixed to each other by said positioning unit in such a manner that said signal terminal connector and said engagement member sandwich therebetween a portion of said exterior member surrounding said signal terminal connector.

2. The accessory shoe device according to claim 1, wherein said exterior member is sandwiched by said signal terminal connector and said engagement member, with an elastic member interposed between said signal terminal connector and said exterior member.

3. The accessory shoe device according to claim 1, wherein said positioning unit determines a position of said signal terminal connector with respect to said engagement member at least in a direction intersecting a direction in which the accessory is attached to said engagement member.

4. The accessory shoe device according to claim 1, wherein the terminals of said signal terminal connector are joined to a circuit board via leads, respectively, and
wherein said positioning unit is disposed outward of outermost ones of the leads and within a projection area of said engagement member in a direction intersecting a direction in which the accessory is attached to said engagement member.

5. The accessory shoe device according to claim 1, wherein said signal terminal connector is located forward of a signal terminal stage in a direction in which the accessory is attached to said engagement member.

6. The accessory shoe device according to claim 1, wherein said engagement member is assembled from an exterior surface side of said exterior member, and said signal terminal connector is assembled from an opposite side to the exterior surface side of said exterior member.

7. The accessory shoe device according to claim 1, wherein said engagement member includes an urging unit for urging the accessory attached to said engagement member in a direction intersecting a direction in which the accessory is attached to said engagement member.

8. The accessory shoe device according to claim 1, wherein said engagement member includes a pair of first engagement portions and a pair of second engagement portions for attachment of an accessory, and spacing between the second engagement portions is larger than spacing between the first engagement portions.

9. An image pickup apparatus including an accessory shoe device to which an accessory is attached,
wherein the accessory shoe device comprises:
an engagement member configured to have an accessory attached thereto;
a signal terminal connector having terminals for connection with the accessory attached to said engagement member;
an exterior member having said engagement member mounted thereon; and
a positioning unit configured to determine a position of said signal terminal connector with respect to said engagement member,
wherein said exterior member has an opening for externally exposing the terminals of said signal terminal connector, and
wherein said signal terminal connector and said engagement member are fixed to each other by said positioning unit in such a manner that said signal terminal connector and said engagement member sandwiches therebetween a portion of said exterior member surrounding said signal terminal connector.

* * * * *